United States Patent
Varble et al.

[11] Patent Number: 6,036,120
[45] Date of Patent: Mar. 14, 2000

[54] FUEL INJECTOR AND METHOD

[75] Inventors: Daniel Lee Varble, Henrietta; Michael Raymond Salemi, Rochester; Harry Richard Mieney, Byron; Min Xu, Pittsford; Youssef Kazour, Fairport, all of N.Y.

[73] Assignee: General Motors Corporation, Detroit, Mich.

[21] Appl. No.: 09/049,183

[22] Filed: Mar. 27, 1998

[51] Int. Cl.$^7$ .............................. F02M 47/00; B05B 1/30
[52] U.S. Cl. ...................... 239/585.1; 239/585.2; 239/585.3; 239/585.4; 239/585.5; 251/129.1; 251/129.7
[58] Field of Search ............................. 239/585.1–585.5; 251/129.7, 129.1

[56] References Cited

U.S. PATENT DOCUMENTS

| | | | |
|---|---|---|---|
| 4,749,167 | 6/1988 | Gottschall | 251/129.1 |
| 4,829,947 | 5/1989 | Lequesne | 123/90.11 |
| 4,831,989 | 5/1989 | Haines | 123/506 |
| 4,883,025 | 11/1989 | Richeson, Jr. | 123/90.11 |
| 4,964,571 | 10/1990 | Taue et al. | 239/88 |
| 4,993,637 | 2/1991 | Kanesaka | 239/96 |
| 5,050,543 | 9/1991 | Kawamura | 123/90.11 |
| 5,421,521 | 6/1995 | Gibson et al. | 239/585.4 |
| 5,494,219 | 2/1996 | Maley et al. | 239/88 |

*Primary Examiner*—Kevin Shaver
*Assistant Examiner*—David Deal
*Attorney, Agent, or Firm*—Vincent A. Cichosz

[57] ABSTRACT

A direct injection fuel injector and method of operation wherein high fuel pressure exerting an opening force on an injection valve is slightly overbalanced by a return spring tending to close the valve. A first solenoid acts to open the valve against the excess return spring force and a second solenoid acts to close the valve when the first solenoid is de-energized. Rapid valve closing is provided by energizing the second solenoid before de-energizing the first solenoid, the force of the second solenoid when the valve is open being insufficient to overcome the force of the first solenoid holding the valve open. Thus, the second solenoid magnetic force is fully developed and quickly closes the injection valve when the first solenoid is de-energized. Various additional features are disclosed.

12 Claims, 1 Drawing Sheet

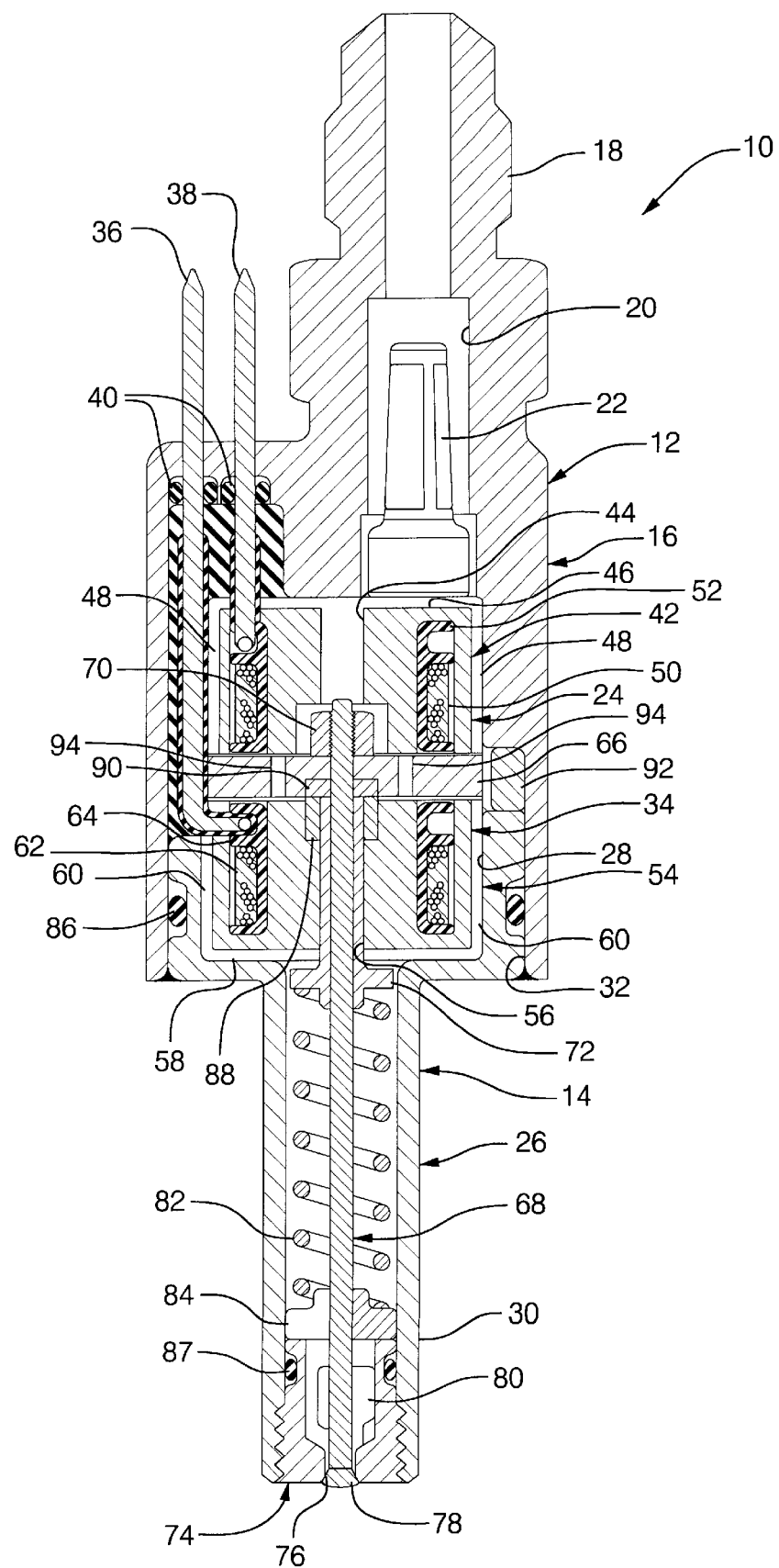

FUEL INJECTOR AND METHOD

TECHNICAL FIELD

This invention relates to fuel injectors for the delivery of fuel by direct injection into the combustion chambers of internal combustion engines. The invention further relates to a method of operating a high pressure direct injection fuel injector with low voltage solenoid coils.

BACKGROUND OF THE INVENTION

In order to provide for the direct injection of fuel into an engine combustion chamber, high fuel pressures are required to overcome compression pressures in the chamber and to generate very fine fuel atomization. The injector must solely prepare the fuel for combustion since the mixing of air and fuel must take place in the combustion chamber during the compression stroke. The time for injection of fuel is limited to the period after the intake valve is closed up to just before the point of ignition. These requirements are considerably more demanding than those of current common systems using port fuel injection. Required fuel pressures for direct injection are on the order of 1500 PSI and fuel particles prior to combustion should be in the range of 15 micrometers or less. The window or time for injection is about ¼ of that for port fuel injection and thus requires a dynamic range (and static flow rate) which is about four times that of a typical port fuel injector.

Direct injection (DI) injectors must be located in the cylinder head. Prior embodiments of DI injectors have generally been larger than current port fuel injectors making it extremely difficult to mount them without compromising the engine cylinder head.

To achieve fast operation at high fuel pressures, DI injectors have sometimes used high voltage and current for actuating their solenoid driven valves. Such voltages and power levels are difficult and expensive to achieve with vehicle systems based on 12 volt DC electrical systems. Further, DI injectors have often been limited as to dynamic range. Consequently, engines provided with such injectors have not been able to run at both low and high load levels.

Typically, DI injectors have used inwardly opening pintle valves in combination with a fuel swirler. The fuel travels through the swirler and then through a single orifice before creating a spray. The fuel recombines in this orifice before the spray is created, making it difficult to achieve small particles as desired. Other DI systems have used outwardly opening pintle nozzles, relying on a pressurized air source to break up the fuel into small droplets. Such systems require an air pump and an additional actuator.

Inwardly opening pintle-type injectors may be affected by combustion chamber deposits which form in the exit orifice, disturbing the fuel spray and decreasing the flow rate. Further, combustion pressures can force a fuel valve to open if the fuel pressure is low and the pintle spring rate is low. Back flow from the combustion chamber can force particles into the injector, upsetting the spray formation and possibly sticking the injector open. Increasing spring load to insure that the injector won't allow back flow, adversely affects opening time as the actuator must overcome this load to open the injection valve.

SUMMARY OF THE INVENTION

The present invention provides a direct injection fuel injector assembly providing in a relatively small package a solenoid actuated injector operated by solenoids requiring only 12 volt DC power and actuating an outwardly opening pintle valve with a swirl generator that provides a conical fuel spray with superior mixing qualities while reducing the potential for back flow from the combustion chamber.

The invention further provides a method of operating a high pressure direct injection fuel injector with low voltage solenoid coils operable, for example, by 12 volt DC electrical systems commonly used in automotive vehicles.

In a preferred embodiment, a return spring offsets the effect of high fuel pressure on the pintle valve so that a pair of low voltage solenoids acting upon an armature are capable of opening and closing the valve without being required to overcome fuel pressure or large return spring forces. The return spring also provides a relatively small excess force sufficient to close the valve if the solenoids become inoperative and to hold the valve closed between valve open periods when the solenoids are off.

These and other features and advantages of the invention will be more fully understood from the following description of certain specific embodiments of the invention taken together with the accompanying drawings.

BRIEF DESCRIPTION OF THE DRAWINGS

The single FIGURE of the drawing is a longitudinal cross-sectional view through a fuel injector formed in accordance with the invention.

DESCRIPTION OF THE PREFERRED EMBODIMENT

Referring now to the drawing in detail, numeral 10 generally indicates an exemplary embodiment of direct injection (DI) fuel injector incorporating features of the invention. To aid in illustrating the invention, some features of the embodiment have been shown in the FIGURE out of their true cross-sectional positions.

For manufacturing convenience, the injector is formed from two assemblies, including an upper housing assembly 12 and a lower housing assembly 14. The upper housing assembly 12 includes an upper housing 16 having an inlet defined by a threaded fuel fitting 18. Fitting 18 communicates through an inlet passage 20 containing a fuel filter 22 with a chamber or recess containing an upper solenoid assembly 24.

Lower housing assembly 14 includes a lower housing 26 having an enlarged upper portion 28 and a smaller diameter tubular lower portion 30. The upper portion has an outer diameter that is received in a generally cylindrical recess 32 formed in the lower portion of the upper housing 16. A lower solenoid assembly 34 is received in an upwardly opening recess of the lower housing upper portion 28. Terminals 36, 38 extend upward from the lower and upper solenoids 24, 34 respectively through openings in the upper housing 16 which are sealed by O-ring seals 40.

The upper solenoid assembly 24 includes a generally cylindrical upper soft (not permanently magnetized) magnetic pole 42 with a central axial passage 44 and a radial or transverse upper groove 46 both connecting with the fuel inlet passage 20. Groove 46 further connects with longitudinally extending external side grooves 48 leading to the lower end of the pole. An annular recess, opening to the lower end of the pole 42 receives an upper solenoid coil 50 wound on a non-magnetic bobbin 52 having an annular upper groove for connection of the coil with its terminals 38.

The lower solenoid assembly 34 also includes a generally cylindrical lower soft magnetic pole 54 having an axial central bore 56 and a radial or transverse groove 58 across its lower side and connecting with external longitudinal side grooves 60 extending to the upper end of the pole. An upwardly opening annular recess in the pole 54 receives a lower solenoid coil 62 also wound on a non-magnetic bobbin 64 having an upper groove for connecting the coil through a slot in the side of the bobbin with the terminals 36 leading from the lower coil.

Located between the magnetic poles 42, 54 is a disc-like armature 66 also formed of soft magnetic material (not permanently magnetized). The armature 66 has a central opening through which extends a pintle 68 having a retaining nut 70 threaded onto one end of the pintle. The nut 70 holds the armature 66 against the upper end of a tubular portion of a spring upper guide 72. The armature 66, pintle 68, nut 70 and guide 72 form an armature assembly, the parts of which are fixed together by the nut for movement in unison.

Guide 72 acts as a tubular valve guide for the upper end of the pintle 68 which extends therethrough and beyond to the lower end of the lower portion 30 of the lower housing 26. An injector nozzle 74 is threadably mounted in the lower end of lower portion 30 and has a centrally located outwardly opening conical valve seat 76 which is engageable by a conical valve element 78 formed on the lower end of the pintle which acts as a pintle valve. A swirl generator 80 is located around the pintle within the injector nozzle 74 defining therewith passages which impart a swirl motion to fuel passing therethrough toward the valve seat 76. The lower end of the spring upper guide 72 forms a spring seat for a helical return spring 82 which extends downward in the lower portion 30 of the lower housing to a lower spring guide 84 that seats against the injector nozzle 74. During assembly, the spring is compressed to the desired force and the upper guide 72 is then welded to the pintle to maintain the return spring force.

Additional components of the injector 10 include a housing seal 86 and an injector nozzle seal 87 to prevent leakage of fuel from the housing 16, 18. The pintle retaining nut 70 is received in a recess in the lower end of the upper pole 42 and forming a part of the axial passage 44. A similar recess in the upper end of the lower pole 54 receives a hardened stop 88 which is engaged by an armature stop 90 to provide a predetermined gap or clearance between the armature 66 and the lower pole 54 when the stops are engaged. The armature stroke is set by turning the threaded nozzle 74 with the valve closed until the spacing of the armature from the stop 88 is equal to the desired stroke. A spacer ring 92 is located between the upper end of the lower housing 26 and a downwardly facing annular abutment in the recess 32 of the upper housing 16. The spacer ring 92 is sized longitudinally after setting of the stroke to provide a predetermined clearance or gap between the armature and the upper magnetic pole when the valve 78 is closed.

In operation, high pressure fuel, controlled at a nearly constant pressure, is supplied through the fuel fitting 18, passage 20 and fuel filter 22 to the interior of the injector housing 16, 26. Fuel passes around the upper and lower poles 42, 54 through the grooves 46, 48, 60, 58, from which it enters the interior of the lower portion 30 of the lower housing 26. A slot, not shown, in the lower spring guide 84 passes fuel into the interior of the injector nozzle 74 where it passes through the swirl generator to the valve seat 76.

High fuel pressure acts against the internally exposed portion of the conical valve element. The high pressure fuel also enters the axial passage 44 and acts against the upper end of the pintle 68. The combined forces of fuel pressure on the pintle and its valve element urge the pintle in a valve opening direction with a constant force determined by the controlled constant fuel pressure.

The return spring 82 is selected to apply a force which is slightly greater than the force of the fuel pressure urging the valve element 78 in an opening direction. Thus, the spring 82 forces the armature upward against the fuel pressure force to maintain the valve in a closed position whenever the coils 50, 62 are de-energized and to provide redundant closing of the valve should the solenoids become inoperative. In the closed position, the armature 66 is located with the previously set gap or clearance between the armature and the upper pole. This gap is presently preferred to be about ⅓ the length of the armature stroke. Relief holes 94 are preferably provided extending longitudinally through the armature 66 to provide for its free motion in opening and closing directions through the fuel which surrounds the armature.

In order to open the valve, the lower coil 62 is energized by the 12 volt electrical system of an associated vehicle. This creates a magnetic force in the lower pole 54 which draws the armature 66 downward and opens the valve against the force of spring 82 and the compression pressure acting against the valve element 78 in the engine combustion chamber. This allows high pressure fuel to be forced out through the nozzle 74 in a thin conical sheet into the combustion chamber where it quickly breaks up into small droplets. Because there is no enclosed nozzle space or sac below the conical valve element, the spray avoids injection of large fuel particles at the beginning and ending of the spray. The swirling motion of the fuel in the conical sheet tends to increase atomization and reduce penetration of the fuel spray within the combustion chamber and thus aids the breaking up of the fuel droplets and mixing with the compressed air charge in the chamber.

Because the return spring 82 only slightly overcomes the force of the fuel pressure acting to open the valve, the system is nearly force balanced. Thus, the magnetic force developed by the lower coil 62 needs only to overcome a relatively small portion of the return spring force so that the coil may be operated by a 12 volt electrical system and still provide fast opening action of the valve. The lower coil 62 continues to be energized during the time the valve 78 is open and fuel is being injected. A downward stroke of the armature opens the valve and moves the armature stop 90 into engagement with the lower pole stop 88 which maintains a gap of about ⅓ the stroke between the armature and the lower pole 54. At the same time the gap between the armature and the upper pole is increased by its downward motion to about 1⅓ times the stroke. The gaps prevent the armature from sticking to either of the poles as a result of any residual magnetism present after their respective solenoids are de-energized.

When the end of the injection period is reached, as determined by the vehicle fuel control, it is desired to quickly close the injection valve 78 against the seat so as to stop the fuel flow in a nearly instantaneous manner. This is preferably accomplished by energizing the upper solenoid coil 50 sufficiently in advance of the desired closing time to allow build up of the magnetic force of the upper coil to near its maximum strength. If the strengths of the two coils are approximately equal, the effective force applied by the upper coil against the armature is lower than that of the lower coil because of the greater gap between the armature and the upper coil of about four times that between the armature and the lower coil while the valve is in the open position. Therefore, the valve remains open until the lower coil is de-energized. When this occurs, the full force of the upper coil applied against the armature quickly draws it upward to the valve closed position, immediately shutting off fuel flow through the injector nozzle opening at the valve seat.

The use of the dual coils to open and close the injection valve permits the near balancing of forces between the return spring 82 and the valve opening force of fuel pressure, sufficient excess spring force being present to hold the valve closed when the solenoids are off and to close the valve if the solenoids become inoperative. This near balancing, in turn, allows both coils to be operated by the 12 volt electrical system of a conventional vehicle and still provide the almost instantaneous valve opening and closing actions necessary to provide accurate control of fuel injection into the engine combustion chamber. When the valve is closed, the upper coil is de-energized and, thereafter, the excess force of the return spring 82 holds the valve closed against the force of the fuel pressure until the time for the next valve opening event has been reached.

While the invention has been described by reference to a specific embodiment, it should be understood that numerous changes could be made within the spirit and scope of the inventive concepts described. Accordingly it is intended that the invention not be limited to the disclosed specific embodiment, but that it have the full scope permitted by the language of the following claims.

We claim:

1. A fuel injector including:
    a housing defining a fuel flow passage having an inlet and an outlet;
    means for connecting the inlet to a source of fuel supply at a controlled elevated fuel pressure;
    an injection valve operable to selectively close and open said outlet for injecting fuel through the outlet into an engine combustion chamber, the fuel pressure acting to urge the valve in an opening direction;
    return means urging said valve in a closing direction with a force slightly in excess of the force exerted by fuel pressure on the valve;
    an armature connected to and movable with the valve;
    first and second solenoids spaced closely on opposite sides of said armature and operative when energized to magnetically attract said armature toward the respective solenoids;
    said first solenoid when energized generating a force sufficient to attract the armature and open the valve against the excess closing force of the return means; and
    said second solenoid when energized generating a force sufficient to close the valve with the assistance of the return means against the force of fuel pressure when the first solenoid is de-energized.

2. A fuel injector as in claim 1 wherein the force of said second solenoid when energized with the valve in an open position is insufficient to close the valve against the force of the first solenoid when energized acting to maintain the valve in the open position, whereby said second solenoid may be energized and build up to its full strength prior to de-energizing said first solenoid so that the valve may be quickly closed when said first solenoid is de-energized.

3. A fuel injector as in claim 2 wherein with the valve in said open position said armature has a minimum gap from said first solenoid and a maximum gap from said second solenoid, said maximum gap from the second solenoid being substantially greater than said minimum gap from the first solenoid so that the effective force of the first solenoid on the armature is maximized and the effective force of the second solenoid on the armature is minimized when both solenoids are energized.

4. A fuel injector as in claim 2 including a swirl generator inwardly adjacent said outlet and causing the discharged fuel to exit the outlet with an angular orientation that increases atomization and reduces penetration in an associated combustion chamber.

5. A fuel injector as in claim 1 wherein said injection valve is an outwardly opening pintle valve extending through said outlet and having an outwardly angled conical surface seatable on a conical valve seat surrounding the outlet, whereby fuel discharged from the outlet is directed in an outwardly angled thin conical sheet.

6. A fuel injector as in claim 1 wherein said first and second solenoids are operable by a 12 volt DC power source.

7. A fuel injector comprising:
    an upper housing assembly having an open lower end and a lower housing assembly having an open upper end, one of said open ends being received in a recess of the other open end;
    said upper housing assembly including an upper housing defining a fuel inlet passage therethrough with a first solenoid mounted in said inlet passage and facing said open lower end;
    said lower housing assembly including a lower housing defining a fuel outlet passage therethrough, said lower housing including a larger upper portion and a smaller lower portion, said upper portion having a second solenoid mounted therein in said outlet passage and facing said open upper end, and said lower portion having a fuel nozzle mounted therein in said outlet passage and closing a lower end of said lower portion;
    an armature assembly reciprocably carried by said lower housing assembly, said armature assembly including a pintle valve having a valve element seatable on a valve seat of said fuel nozzle and connected by a pintle to an armature between said solenoids and magnetically attractable thereby for moving said valve between open and closed positions;
    return means in said lower housing assembly and biasing said valve in a closing direction, said return means having a force slightly greater than the force of fuel exerted on said armature assembly in a valve opening direction when fuel is provided at a controlled relatively constant pressure in said inlet and outlet fuel passages;
    whereby the return means normally maintains the valve closed against the force of the fuel but the valve may be opened by the first solenoid with a magnetic force sufficient to overcome the excess force of the return means and the valve may be closed by the second solenoid when the first solenoid is de-energized.

8. A fuel injector as in claim 7 wherein the force of said second solenoid when energized with the valve in an open position is insufficient to close the valve against the force of the first solenoid when energized acting to maintain the valve in the open position, whereby said second solenoid may be energized and build up to its full strength prior to de-energizing said first solenoid so that the valve may be quickly closed when said first solenoid is de-energized.

9. A fuel injector as in claim 8 wherein with the valve in said open position said armature has a minimum gap from said first solenoid and a maximum gap from said second solenoid, said maximum gap from the second solenoid being substantially greater than said minimum gap from the first solenoid so that the effective force of the first solenoid on the armature is maximized and the effective force of the second solenoid on the armature is minimized when both solenoids are energized.

10. A fuel injector as in claim 7 wherein said injection valve is an outwardly opening pintle valve extending through said outlet and having an outwardly angled conical surface seatable on a conical valve seat surrounding the outlet, whereby fuel discharged from the outlet is directed in an outwardly angled thin conical sheet.

11. A fuel injector as in clam 10 including a swirl generator inwardly adjacent said outlet and causing the discharged fuel to exit the outlet with an angular orientation that increases atomization and reduces penetration in an associated combustion chamber.

12. A fuel injector as in claim 7 wherein said first and second solenoids are operable by a 12 volt DC power source.

* * * * *